(12) United States Patent
Hsu et al.

(10) Patent No.: US 9,232,484 B2
(45) Date of Patent: Jan. 5, 2016

(54) APPARATUS AND METHODS OF HSPA TRANSMIT POWER CONTROL

(71) Applicant: QUALCOMM Incorporated, San Diego, CA (US)

(72) Inventors: Chih-Ping Hsu, San Diego, CA (US); Jimmy Chi-Wai Chui, Santa Clara, CA (US); Nate Chizgi, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 156 days.

(21) Appl. No.: 13/958,928

(22) Filed: Aug. 5, 2013

(65) Prior Publication Data

US 2014/0146726 A1    May 29, 2014

Related U.S. Application Data

(60) Provisional application No. 61/731,354, filed on Nov. 29, 2012.

(51) Int. Cl.
*H04W 52/40* (2009.01)
*H04W 52/28* (2009.01)

(52) U.S. Cl.
CPC .......... *H04W 52/40* (2013.01); *H04W 52/286* (2013.01)

(58) Field of Classification Search
CPC .................................................... H04W 52/40
See application file for complete search history.

(56) References Cited

U.S. PATENT DOCUMENTS

| 2007/0082620 | A1* | 4/2007 | Zhang et al. ................ 455/69 |
| 2007/0281728 | A1 | 12/2007 | Charriere et al. |
| 2008/0200202 | A1 | 8/2008 | Montojo et al. |
| 2010/0298021 | A1* | 11/2010 | Bergman et al. ............. 455/522 |
| 2010/0331035 | A1 | 12/2010 | Bark et al. |
| 2012/0178493 | A1 | 7/2012 | Marquez et al. |
| 2012/0182945 | A1 | 7/2012 | Blomgren et al. |
| 2012/0213092 | A1 | 8/2012 | Sun et al. |
| 2013/0094477 | A1* | 4/2013 | Liu et al. .................... 370/335 |

OTHER PUBLICATIONS

International Search Report and Written Opinion—PCT/US2013/071431—ISA/EPO—Jan. 30, 2014.

* cited by examiner

*Primary Examiner* — Jason Mattis
(74) *Attorney, Agent, or Firm* — Darren M. Simon

(57) ABSTRACT

Methods and apparatus of controlling user equipment transmit power in a wireless communication system include communicating with a first base station and a second base station. Further, the methods and apparatus include establishing a high speed channel with one of the first base station or the second base station, wherein the one of the first base station or the second base station defines a high speed serving cell and a remaining one of the first base station or the second base station defines a non-high speed cell. Additionally, the methods and apparatus include ignoring a transmit power control command from the non-high speed cell when a high speed power control state applies to controlling a transmit power level.

29 Claims, 10 Drawing Sheets

APPARATUS AND METHODS OF HSPA TRANSMIT POWER CONTROL

CLAIM OF PRIORITY UNDER 35 U.S.C. §119

The present application for patent claims priority to Provisional Application No. 61/731,354 entitled "Apparatus and Methods of HSPA Transmit Power Control" filed Nov. 29, 2012, and assigned to the assignee hereof and hereby expressly incorporated by reference herein.

BACKGROUND

1. Field

Aspects of the present disclosure relate generally to wireless communication systems, and more particularly, to transmit power control of a user equipment operating according to High-Speed Packet Access (HSPA) protocol.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), including High-Speed Downlink Packet Access (HSDPA) and High-Speed Uplink Packet Access (HSUPA), and Evolved HSPA (HSPA+), both of which provide higher data transfer speeds and capacity to associated UMTS networks.

One problem with operation of a user equipment (UE) according to the HSPA protocol occurs when the UE is in a soft handover with imbalanced cells. For example, the UE may be in communication with a high-speed (HS) serving cell and a non-HS cell. In this situation, the UE operating according to HSPA in a soft handover with imbalanced cells causes significant HS communication performance degradation.

Thus, improvements in power control of UE transmissions during HSPA operation are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, a method of controlling user equipment transmit power in a wireless communication system comprises communicating with a first base station and a second base station. Further, the method comprises establishing a high speed channel with one of the first base station or the second base station, wherein the one of the first base station or the second base station defines a high speed serving cell and a remaining one of the first base station or the second base station defines a non-high speed cell. Additionally, the method comprises ignoring a transmit power control command from the non-high speed cell when a high speed power control state applies to controlling a transmit power level.

In another aspect, an apparatus for wireless communication comprises means for communicating with a first base station and a second base station. Further, the apparatus comprises, means for establishing a high speed channel with one of the first base station or the second base station, wherein the one of the first base station or the second base station defines a high speed serving cell and a remaining one of the first base station or the second base station defines a non-high speed cell. Additionally, the apparatus comprises means for ignoring a transmit power control command from the non-high speed cell when a high speed power control state applies to controlling a transmit power level.

Additional aspects include a computer program product comprising a computer-readable medium comprising code for communicating with a first base station and a second base station. Further, the computer-readable medium comprises code for establishing a high speed channel with one of the first base station or the second base station, wherein the one of the first base station or the second base station defines a high speed serving cell and a remaining one of the first base station or the second base station defines a non-high speed cell. Also, the computer-readable medium comprises code for ignoring a transmit power control command from the non-high speed cell when a high speed power control state applies to controlling a transmit power level.

Moreover, in an aspect, an apparatus for wireless communication comprises at least one processor and a memory coupled to the at least one processor, wherein the at least one processor is configured to communicate with a first base station and a second base station. The at least one processor is further configured to establish a high speed channel with one of the first base station or the second base station, wherein the one of the first base station or the second base station defines a high speed serving cell and a remaining one of the first base station or the second base station defines a non-high speed cell. Additionally, the at least one processor is configured to ignore a transmit power control command from the non-high speed cell when a high speed power control state applies to controlling a transmit power level.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
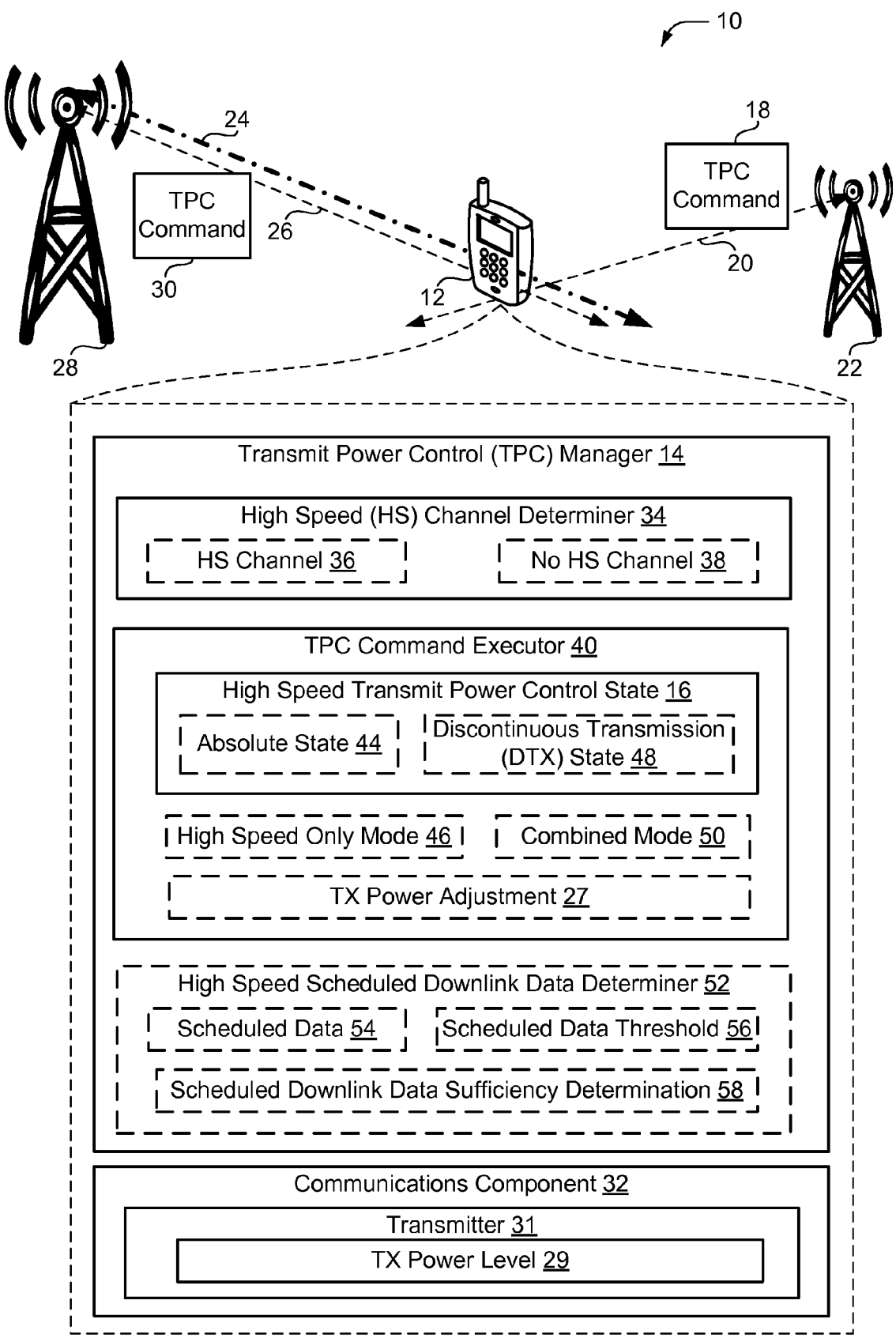
FIG. 1 is a schematic diagram of an aspect of a wireless communication system including a user equipment having a transmit power control manager as described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present apparatus and methods relate to controlling a transmit power level of a user equipment (UE) communicating with two base stations, including a serving high speed base station providing a high speed channel to the UE. In this case, the serving high speed base station may be referred to as a serving high speed cell, while the other base station in communication with the UE may be referred to as a non-high speed cell. For instance, the high-speed serving cell may be a cell closer in proximity to the UE and having higher communication characteristics (e.g., improved transmit/receive communication with UE) relative to the non-high speed cell. However, the opposite may also be true. Specifically, for example, an imbalanced cell scenario may exist when the non-high speed serving cell exhibits higher communication characteristics (e.g., improved transmit/receive communication with UE) relative to the high-speed serving cell. In an aspect, for example, the UE may include a transmit power control manager that determines to ignore a transmit power control command from the base station that is not serving the high speed channel, e.g., the non-high speed cell, when the high speed channel is assigned and/or established. In another aspect, for example, the transmit power control manager may ignore a transmit power control command from the non-high speed cell when the high speed channel is assigned and/or established only based on determining a lack of scheduled data to be transmitted from the serving high speed cell to the UE on the high speed channel. As such, by ignoring transmit power control command from the non-high speed cell, the UE may improve high speed channel performance as compared to current solutions that do not ignore transmit power control command from the non-high speed cell.

For instance, the UE may experience improved high speed channel performance when, without the present apparatus and methods, an imbalance would exist between the two base stations when the UE follows existing transmit power control procedures where transmit power control commands from both base stations may be implemented. For example, these existing transmit power control procedures may be referred to as "or-of-the-down" soft handover transmit power control combining, where the UE will follow a down command to reduce transmit power no matter what base station provides the down command. For instance, the imbalance between the base stations for the UE following the existing procedure may occur when the non-high speed cell commands the UE to reduce power such that transmissions from the UE do not reach the serving high speed cell. In some cases, such an imbalance condition may be based on different power amplifications, e.g., the serving high speed cell being located further away from the UE than the non-high speed cell, and thus having a higher transmit power needed to communicate with the UE. In other cases, such an imbalance condition may be based on different uplink (UL) and downlink (DL) propagation conditions. In any case, the present apparatus and methods allow the UE to ignore transmit power control commands, such as a down command to reduce transmit power, from the non-high speed cell. Thus, based on operating according to the present apparatus and methods, the UE may experience less high speed channel degradation and/or improved high speed channel throughput.

Referring to FIG. 1, in an aspect, a wireless communication system 10 includes a user equipment 12 having a transmit power control manager 14 that is executable, based on a high speed transmit power control state 16, to ignore transmit power control (TPC) commands 18 from a non-high speed cell 20 associated with a first base station 22 when UE 12 has an assigned or established high speed channel 24 from a serving high speed cell 26 associated with a second base station 28. In other words, when UE 12 is communicating with both first base station 22 and second base station 28, such as in a soft handover state, transmit power control manager 14 may determine to only execute TPC commands 30 from serving high speed cell 26 associated with a second base station 28 to generate a transmit power adjustment 27 to change a transmit power level 29 of a transmitter 31 of UE 12. As such, UE 12 may be able to control transmit power level 29 to maintain communications with serving high speed cell 26, e.g., to send acknowledged (ACK) or not acknowledged (NAK) messages (or any other messages) in response to data transmitted on high speed channel 24 with enough power to reach serving high speed cell 26. Accordingly, based on the operation of transmit power control manager 14 as described herein, UE 12 may experience less high speed channel degradation and/or improved high speed channel throughput.

In some aspects, UE 12 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. Additionally, first base station 22 and/or second base station 28 may be a macrocell, picocell, femtocell, relay, Node B, mobile Node B, UE (e.g., communicating in peer-to-peer or ad-hoc mode with UE 12), or substantially any type of component that can communicate with UE 12 to provide wireless network access at the UE 12.

For example, in an aspect, UE 12 may include a communications component 32 configured to establish a communications connection with both non-high speed cell 20 associated with first base station 22 and serving high speed cell 26 associated with second base station 28. For instance, such established communications may occur in a soft handoff scenario, where UE 12 maintains communications at the same time with both non-high speed cell 20 associated with first base station 22 and serving high speed cell 26 associated with second base station 28. In addition, communications component 32 is also configured to initiate assignment or establishment of high speed channel 24 with serving high speed cell 26 associated with second base station 28. High speed channel 24 may include, but is not limited to, a channel that operates according to High Speed Packet Access (HSPA) protocol, including High-Speed Downlink Packet Access (HSDPA) protocol and High-Speed Uplink Packet Access (HSUPA) protocol, and Evolved HSPA (HSPA+) protocol. It should be noted that based on the protocol, high speed channel 24 may not be in soft handover, meaning that high speed channel 24 may exist only between serving high speed cell 26 associated with second base station 28 and UE 12, and no such high speed channel may co-exist with first base station 22. Additionally, communications component 32 may include transmit and receive components, including transmitter 31.

Further, UE 12 may also include a high speed channel determiner 34 configured to detect existence of high speed channel 24. For example, high speed channel determiner 34 may communicate with or monitor activity of communications component 32, or one or more protocol layers associated therewith, to identify or otherwise indicate high speed channel existence 36 or no high speed channel 38.

Moreover, UE 12 may include a transmit power control (TPC) command executor 40 configured to determine which transmit power control commands, e.g. TPC commands 18 from non-high speed cell 20 and/or TPC commands 30 from serving high speed cell 26 to execute, to adjust transmit power level 29 of transmitter 31. For instance, TPC commands 18 and 30 may include up commands to increase transmit power, or down commands to decrease transmit power. In an aspect, but not limited hereto, TPC commands 18 and 30 may be in the form of a bit, where the value of the bit indicates an up command or a down command, and the up or down power level adjustment is an understood value. In any case, to determine which transmit power control commands to follow, TPC command executor 40 may communicate with high speed channel determiner 34 to determine if high speed channel 24 exists, e.g., based on the indicator for high speed channel existence 36 or no high speed channel 38.

When high speed channel 24 exists, then TPC command executor 40 may be configured to determine high speed transmit power control state 16. In one aspect, for example, high speed transmit power control state 16 may include an absolute state 44 that includes operating TPC command executor 40 according to a high speed only mode 46. In an aspect, high speed only mode 46 includes an algorithm or procedure to ignore TPC commands 18, e.g. either all commands or at least down commands to reduce transmit power, from non-high speed cell 20 at any time that UE 12 has an assigned or established high speed channel 24 from serving high speed cell 26. In other words, according to absolute state 44 and high speed only mode 46, TPC command executor 40 may only execute TPC commands 30 from serving high speed cell 26, or at least only down commands from serving high speed cell 26 while ignoring down commands from non-high speed cell 20.

In another aspect, for example, high speed transmit power control state 16 may include a discontinuous transmission (DTX) state 48 that includes operating TPC command executor 40 according to either high speed only mode 46 or a combined mode 50, depending on data scheduled for transmission to UE 12 on high speed channel 24. For example, when a sufficient amount of data is scheduled for transmission, then DTX state 48 dictates operating TPC command executor 40 according to high speed only mode 46, as discussed above. However, when an insufficient amount of data is scheduled for transmission, then DTX state 48 dictates operating TPC command executor 40 according to combined mode 50. In an aspect, for example, combined mode 50 includes an algorithm or procedure to execute both TPC commands 18 and TPC commands 30, e.g. either all commands or at least all down commands to reduce transmit power, from both non-high speed cell 20 and serving high speed cell 26 at any time that UE 12 has an assigned or established high speed channel 24 from serving high speed cell 26. Further, combined mode 50 may define operating UE 12 in the same manner as, or a similar to, operation according to existing transmit power control procedures such as "or-of-the-down" soft handover transmit power control combining, but only when UE 12 is in DTX state 48. Additionally, it should be noted that operating TPC command executor 40 according to combined mode 50 may avoid maintaining transmit power level 29 of transmitter 31 at an unnecessarily high level, which may thereby avoid or reduce interference.

For example, in an aspect of operation in DTX state 48, TPC command executor 40 may communicate with a high speed scheduled downlink data determiner 52 that is configured to determine whether an insufficient amount of data is scheduled to be transmitted on high speed channel 24, thereby triggering operation according to combined mode 50. For instance, in one aspect that should not be construed as limiting, high speed scheduled downlink data determiner 52 may be configured to determine scheduled data for transmission 54, or a lack thereof such as based on Shared Control Channel (SCCH) failures, and compare it to a scheduled data for transmission threshold 56 in order to generate a scheduled downlink data sufficiency determination 58. For example, scheduled downlink data sufficiency determination 58 may indicate insufficient scheduled downlink data when scheduled data for transmission 54 is less than scheduled data for transmission threshold 56 or sufficient scheduled downlink data when scheduled data for transmission 54 is equal to or greater than scheduled data for transmission threshold 56. As such, in an aspect where UE 12 is operating according to DTX state 48, scheduled downlink data sufficiency determination 58 may trigger combined mode 50 based on insufficient data being scheduled for transmission on high speed channel 24, or high speed only mode 46 based on sufficient data being scheduled for transmission on high speed channel 24. It should be noted that in some aspects, high speed scheduled downlink data determiner 52 may not immediately trigger combined mode 50 and/or high speed only mode 46, but instead may wait a time period before doing so, e.g., in order to avoid abrupt transitions and/or a ping-ping effect. For instance, high speed scheduled downlink data determiner 52 may include a delay or hysteresis value, which may correspond to the time period and/or a timer, such that high speed scheduled downlink data determiner 52 waits an amount of time equal to the delay or hysteresis value before triggering combined mode 50 and/or high speed only mode 46 based on scheduled downlink data sufficiency determination 58.

On the other hand, when high speed channel 24 does not exist, e.g. based on the indication of no high speed channel 38, then TPC command executor 40 may operate UE 12 to execute according to combined mode 50. In one aspect, operating according to combined mode 50 may be the same as, or similar to, operation according to existing transmit power control procedures such as "or-of-the-down" soft handover transmit power control combining.

Therefore, according to the present apparatus and methods, UE 12 executing transmit power control manager 14 may improve power control of UE transmissions during HSPA operation, such as when UE 12 is in a soft handover with imbalanced cells. While the examples provided herein relate to a soft handover between two cells, it should be noted that the present apparatus and methods may likewise apply to the soft handover of multiple cells. For example, such a soft handover may include multiple cells in terms of the number of total cells (e.g., >=2), and/or in terms of the total number of high speed serving cells (e.g., >=1).

Figure 2:
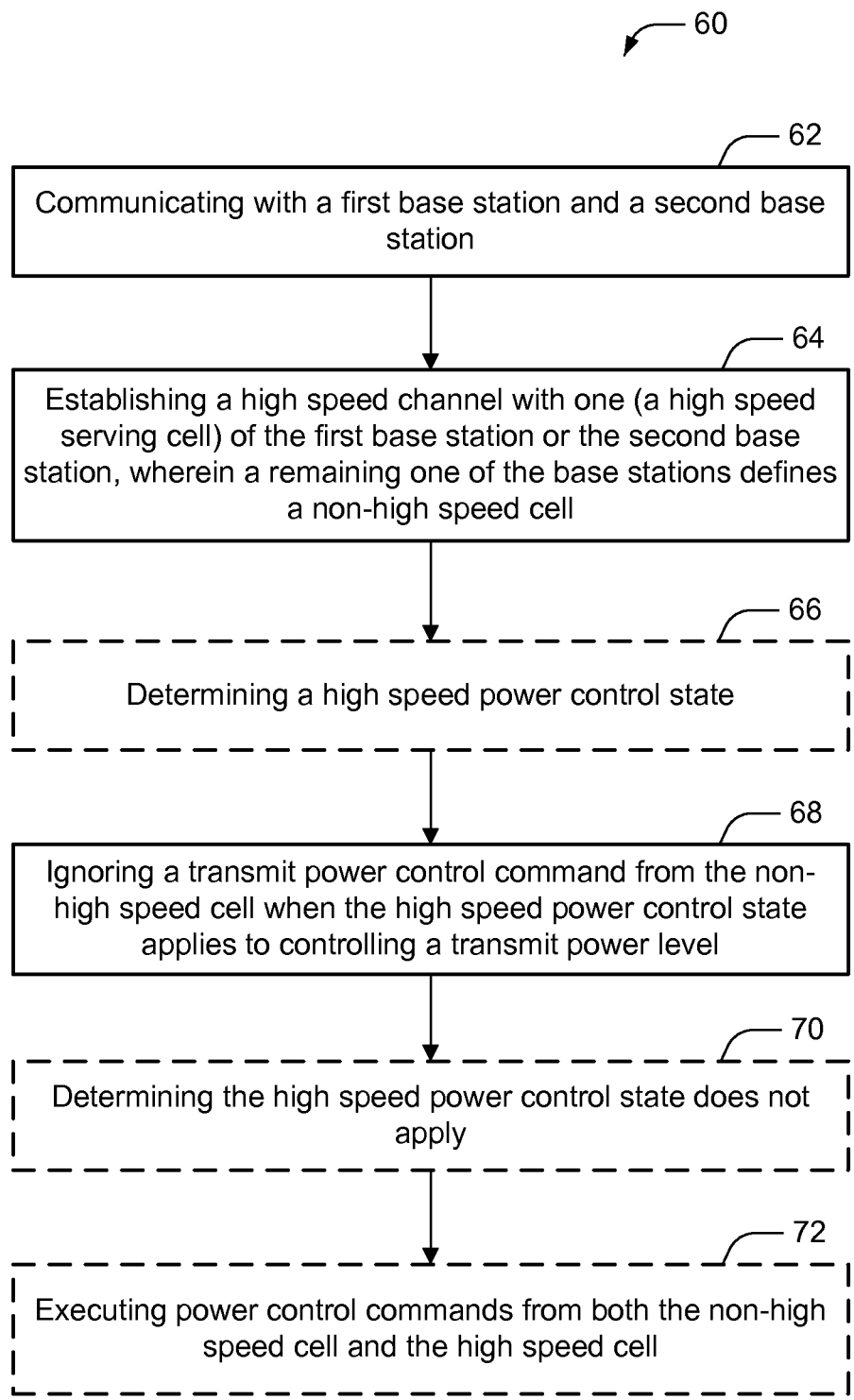
FIG. 2 is a flowchart of an aspect of a method of controlling transmit power of a user equipment, e.g., according to FIG. 1.

Referring to FIG. 2, in operation, UE 12 may implement an aspect of a method 60 of controlling user equipment transmit power in a wireless communication system. While, for purposes of simplicity of explanation, the methods herein are shown and described as a series of acts, it is to be understood and appreciated that the methods are not limited by the order of acts, as some acts may, in accordance with one or more aspects, occur in different orders and/or concurrently with other acts from that shown and described herein. For example, it is to be appreciated that the methods could alternatively be represented as a series of interrelated states or events, such as in a state diagram. Moreover, not all illustrated acts may be required to implement a method in accordance with one or more features described herein.

Method 60 may include communicating with a first base station and a second base station (Block 62). For example, in an aspect, UE 12 may include a communications component 32 (FIG. 1) configured to establish communications with both non-high speed cell 20 associated with first base station 22 and serving high speed cell 26 associated with second base station 28.

Also, method 60 may include establishing a high speed channel with one of the first base station or the second base station, wherein the one of the first base station or the second base station defines a high speed serving cell and a remaining one of the first base station or the second base station defines a non-high speed cell (Block 64). For example, in an aspect, UE 12 may include a communication component 32 (FIG. 1) configured to establish high speed channel 24 with serving high speed cell 26 associated with second base station 28.

Optionally, method 60 may include determining a high speed power control state (Block 66). For example, in an aspect, UE 12 (FIG. 1) may include TPC command executor 40 that communicates with HS channel determiner 34 to determine whether high speed channel 24 exists. If so, TPC command executor 40 may determine the high-speed transmit power control state 16, such as absolute state 44 or DTX state 48, to then determine whether to operate according to HS only mode 46 or combined mode 50.

Further, method 60 may include ignoring a transmit power control command from the non-high speed cell when a high speed power control state applies to controlling a transmit power level (Block 68). For example, in an aspect, UE 12 (FIG. 1) may include TPC command executor 40 that determines whether high-speed transmit power control state 16 comprises absolute state 44 or DTX state 48 with a sufficient amount of scheduled downlink data on high speed channel 24, thereby determining to operate according to HS only mode 46. As such, in this condition, UE 12 may only execute TPC commands 30, such as down commands, from serving high speed cell 26 associated with second base station 28.

Optionally, method 60 may include determining the high speed power control state does not apply (Block 70). For example, in an aspect, UE 12 (FIG. 1) may include TPC command executor 40 that communicates with HS channel determiner 34 to determine that high speed channel 24 does not exist. As such, TPC command executor 40 may determine that high-speed transmit power control state 16 does not apply to executing TPC commands.

Optionally, method 60 may include executing power control commands from both the non-high speed cell and the high speed cell (Block 72). For example, in an aspect, UE 12 (FIG. 1) may include TPC command executor 40 that determines high-speed transmit power control state 16 does not apply, and thus operates according to combined mode 50. As such, in this condition, UE 12 may execute TPC commands 18 from non-high speed cell 20 associated with first base station 22 and/or TPC commands 30 from serving high speed cell 26 associated with second base station 28, where TPC commands 18 and 30 include at least down commands Referring to FIG. 3, in operation, UE 12 may implement an aspect of a method 80 of controlling UE transmit power in a wireless communication system. For example, FIG. 3 implements method 80 where UE 12 communicates on the HSDPA channel with a high-speed serving cell. Specifically, FIG. 3 alleviates the substantial performance degradation on HSDPA resulting from excessive or unnecessary power control commands transmitted and received from non-high speed cells.

At block 81, method 80 may determine whether a UE communicates with first base station or second base station. For example, as described herein, UE 12 may execute communications component 32 (FIG. 1) to determine or at least provide indication to one or more component and/or subcomponent of UE 12 as to whether UE 12 is communicating with one or more base stations (e.g., base station 22 and/or base station 28). Upon determining that UE 12 communicates with only a single base station (e.g., base station 28), method 80 may return to block 81 to continue determining or otherwise monitoring the UE 12 connection and/or communication state.

However, upon determining that UE 12 is communicating with a first base station and a second base station (e.g., UE 12 communicating with both base station 22 and base station 28 in soft handover), method 80 may continue to block 82, where UE 12 determines whether an HSDPA channel has been established and/or assigned. For instance, as described herein, transmit power control manager 14 (FIG. 1) may execute high speed channel determiner 34 to determine whether an HSDPA channel has been established on at least one of base station 22 and base station 28. In some aspects, the HSDPA channel may be established and/or assigned on serving high speed cell 26 of base station 28. Upon determining that no HSDPA channel has been established, method 80 may return to block 82 to continue determining and/or monitoring of whether an HSDPA channel has been established.

Upon a determination in the affirmative at block 82, that is, the establishment of an HSDPA channel on at least one base station, or more specifically, a high speed cell of the at least one base station (e.g., serving high speed cell 26 of base station 28), method 80 may continue to block 83, where a determination is made as to whether UE 12 is in a high speed power control state. For example, as described herein, UE 12

(FIG. 1) may execute TPC command executor 40 to determine whether UE 12 is in a high speed power control state 16.

Figure 4:
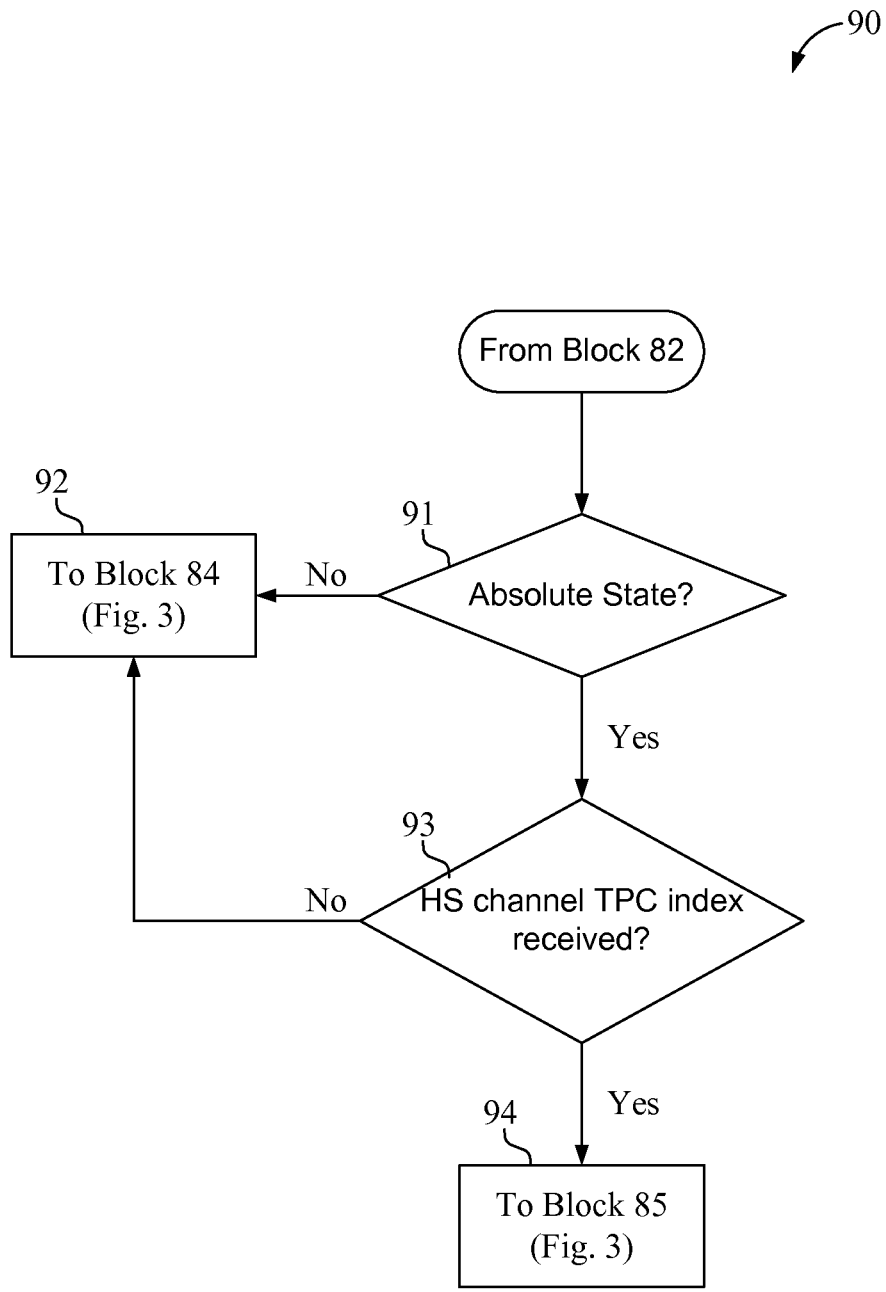
FIG. 4 is a flowchart of an aspect of a high speed power control state, e.g., according to FIG. 1.
Figure 5:
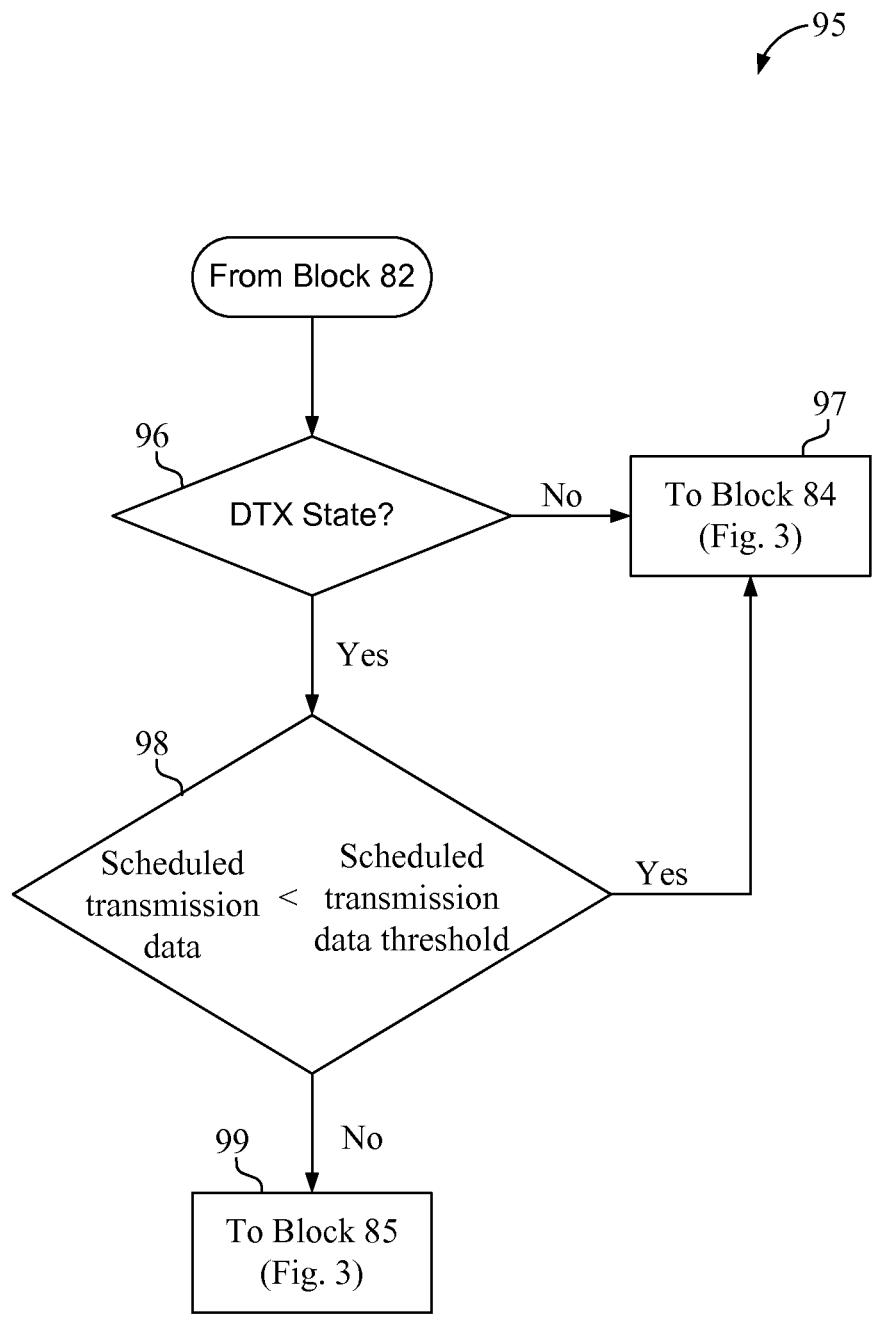
FIG. 5 is a flowchart of a further aspect of a high speed power control state, e.g., according to FIG. 1.

In some aspects, high speed power control state 16 may include an absolute state 44 (e.g., aspects of which are further described in FIG. 4) or DTX state 48 (e.g., aspects of which are further described in FIG. 5). If the high speed power control state 16 is not detected or otherwise determined, method 80 may continue to block 84, where transmit power control commands from both a high speed serving cell (e.g., HSDPA channel) and non-high speed cell are executed. In such aspects, power up and/or power down commands received from both the high speed serving cell (e.g., serving high speed cell 26) and non-high speed cell (e.g., non-high speed cell 20) may be executed by UE 12.

In further aspects, upon determining that UE 12 operates in a high speed power control state, method 80 may continue to block 85, where UE 12 ignores the transmit power control commands from the non-high speed cell. For instance, as described herein, transmit power control manager 14 (FIG. 1) may execute TPC command executor 40 to ignore the transmit power control commands from the non-high speed cell. In some aspects, power down commands (e.g., TPC commands 18) from non-high speed cell (e.g., non-high speed cell 20) may be ignored such that power up/down commands (e.g., TPC commands 30) from the serving high speed cell (e.g., serving high speed cell 26) are executed. Accordingly, method 80 continues to block 86, where a determination is made as to whether the HSDPA channel has been de-established.

For example, transmit power control manager 14 (FIG. 1) may execute high speed channel determiner 34 to determine whether the HSDPA channel has been de-established. If not, UE 12 continues to ignore the power down commands from the non-high speed cell. However, if the HSDPA channel has been de-established, method 80 may proceed to block 84, where transmit power control commands from both a high speed serving cell and non-high speed cell may be executed.

Figure 3:
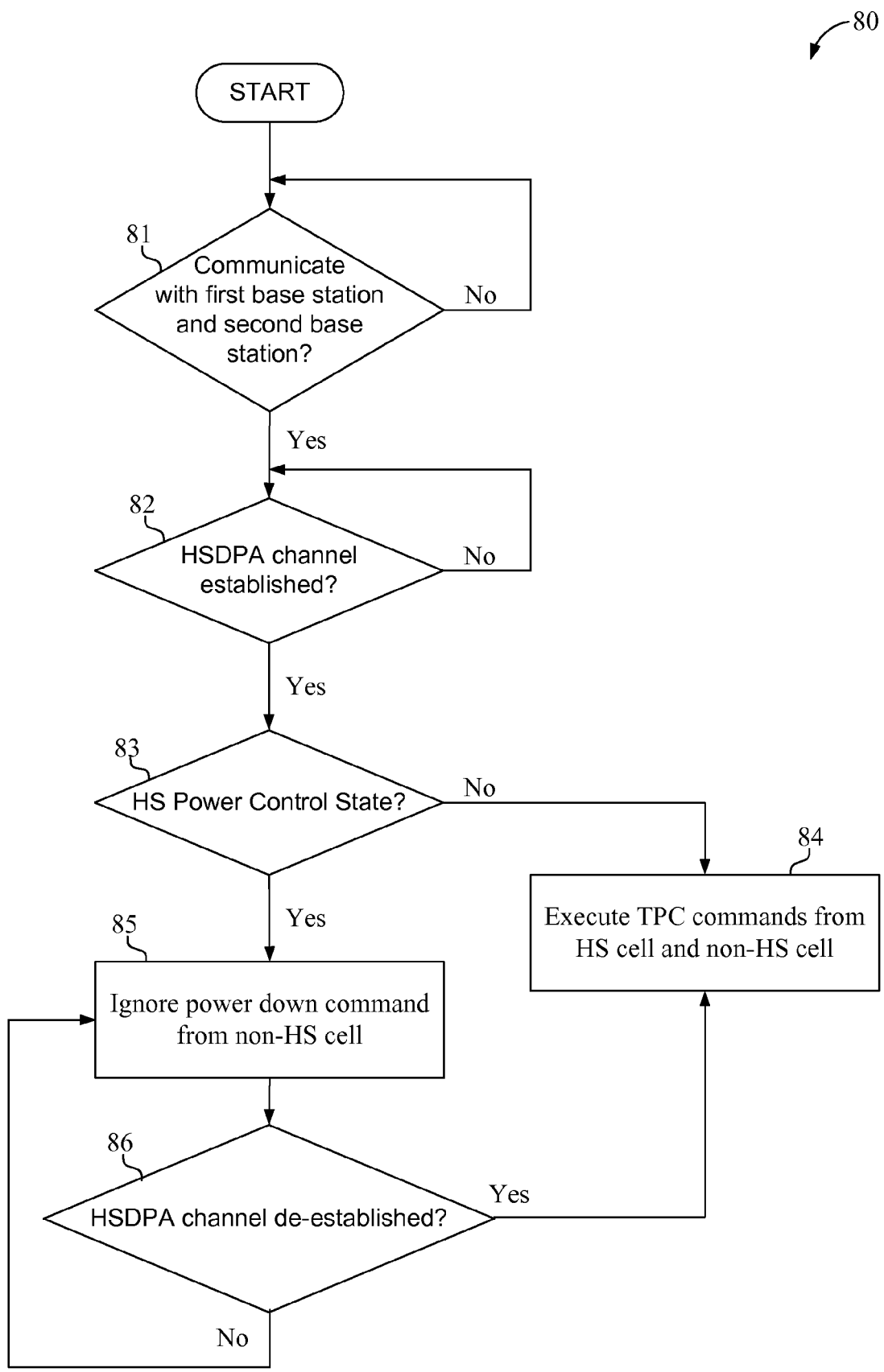
FIG. 3 is a flowchart of another aspect of a method of controlling transmit power of a user equipment, e.g., according to FIG. 1.

Referring to FIG. 4, in operation, UE 12 may implement an aspect of a method 90 of controlling UE transmit power in a wireless communication system according to an aspect of the absolute state. In particular, method 90 may represent, replace, and/or be part of block 83 of FIG. 3. For example, method 90 may continue from block 82 (FIG. 3).

At block 91, method 90 determines whether an absolute is determined or otherwise detected. For example, TPC command executor 40 (FIG. 1) may execute, determine or otherwise detect whether high speed transmit power control state 16 is in an absolute state 44. Upon determining that high speed transmit power control state 16 is not in an absolute state 44, method 90 may continue to block 92 where method 90 returns to block 84 (FIG. 3), and executes TPC commands from both the high speed cell (e.g., high speed cell 26, FIG. 1) and non-high speed cell (e.g., non-high speed cell 20, FIG. 1).

However, if it is determined that UE 12 (FIG. 1), by way of one or more components and/or subcomponents of transmit power control manager 14 is operating in the absolute state 44 (FIG. 1), method 90 may continue to block 93, where a determination is made as to whether a high speed channel TPC index message is received. For instance, as described herein, UE 12 may execute transmit power control manager 14 to determine whether a high speed channel TPC index is received from the base station (e.g., base station 28) deploying high speed cell (e.g., serving high speed cell 26). Upon determining that no such high speed channel TPC index indication is received, method 90 returns to block 84 (FIG. 3). However, when the high speed TPC channel index is determined or otherwise detected to have been received, method 90 may continue to block 85 (FIG. 3), whereby UE 12 may ignore one or more power down commands the non-high speed cell.

In other aspects, referring to FIG. 5, in operation, UE 12 may implement an aspect of a method 95 of controlling UE transmit power in a wireless communication system according to an aspect of the DTX state. In particular, method 95 may represent, replace, and/or be part of block 83 of FIG. 3. For instance, method 95 may continue from block 82 (FIG. 3).

At block 96, method 95 determines whether a DTX state is determined or otherwise detected. For example, as described herein, TPC command executor 40 (FIG. 1) may execute, determine or otherwise detect whether high speed transmit power control state 16 is in a DTX state 48 (FIG. 1). Upon determining that high speed transmit power control state 16 is not in a DTX state 48, method 95 may continue to block 97 where method 95 returns to block 84 (FIG. 3), and executes TPC commands from both the high speed cell (e.g., high speed cell 26, FIG. 1) and non-high speed cell (e.g., non-high speed cell 20, FIG. 1).

However, if it is determined that UE 12 (FIG. 1), by way of one or more components and/or subcomponents of transmit power control manager 14 is operating in the DTX state 48 (FIG. 1), method 95 may continue to block 98, where a comparison is made to determine whether scheduled data for transmission 54 (FIG. 1) is less than or equal to scheduled data for transmission threshold 56 (FIG. 1). For example, as described herein, transmit power control manager 14 may execute high speed scheduled downlink data determiner 52 to determine whether scheduled data for transmission 54 is less than scheduled data for transmission threshold 56. Upon determining that scheduled data for transmission 54 is less than scheduled data for transmission threshold 56, method 95 returns to block 84 (FIG. 3). However, when the scheduled data for transmission 54 is greater than or equal to the scheduled data for transmission threshold 56, method 95 may continue to block 85 (FIG. 3), whereby UE 12 may ignore one or more power down commands the non-high speed cell.

Figure 6:
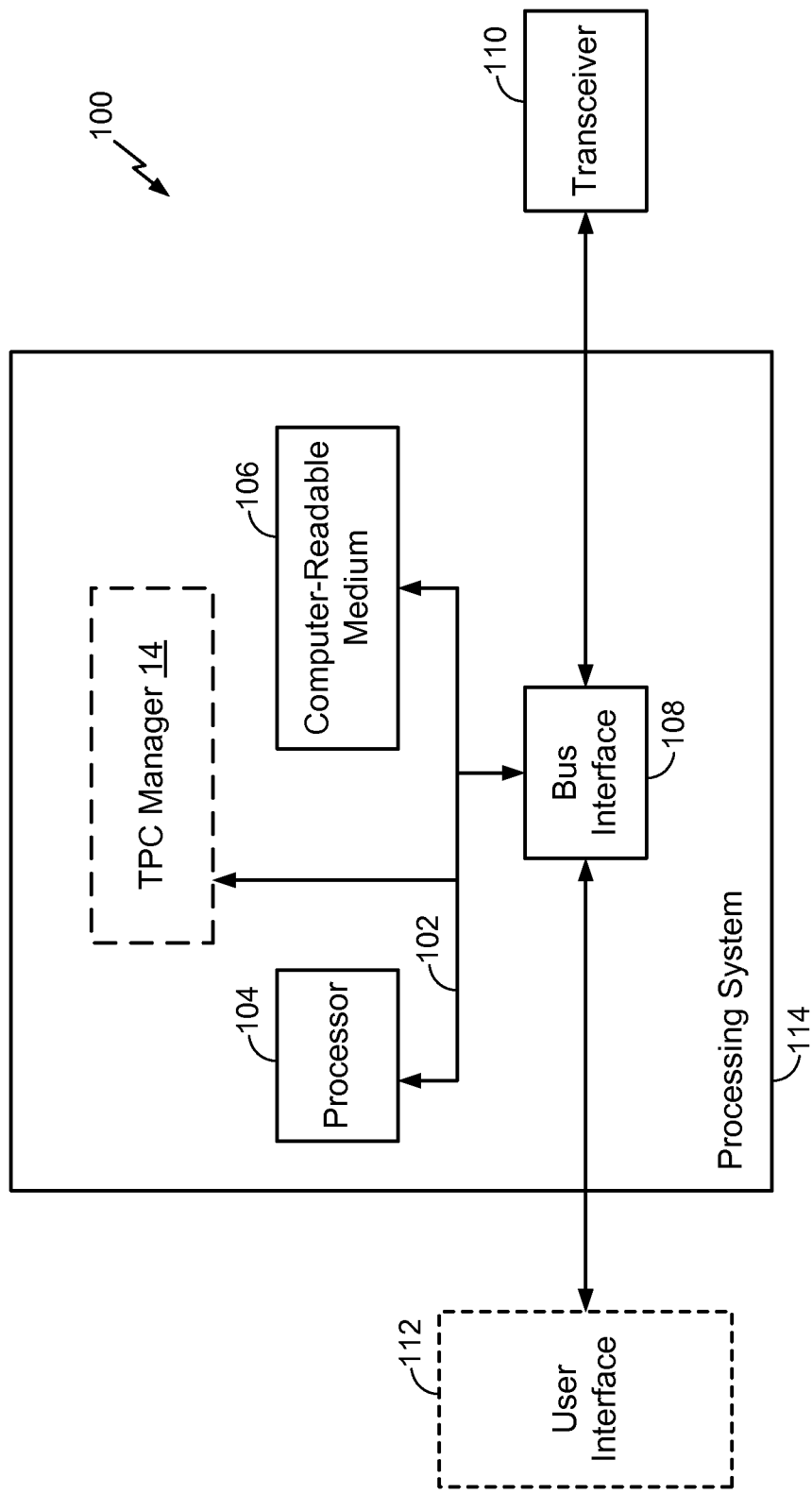
FIG. 6 is a block diagram illustrating an example of a hardware implementation for an apparatus employing a processing system that includes the present aspects.

FIG. 6 is a block diagram illustrating an example of a hardware implementation for an apparatus 100 employing a processing system 114, where apparatus 100 may be UE 12 (FIG. 1) that includes transmit power control manager 14 within processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software. In an aspect, for example, processor 104 and/or computer-readable medium 106 may be configured to include the algorithms and/or structures for carrying out the functions of transmit power control manager 14 (FIG. 1) described herein.

The various concepts presented throughout this disclosure may be implemented across a broad variety of telecommunication systems, network architectures, and communication standards.

Figure 7:
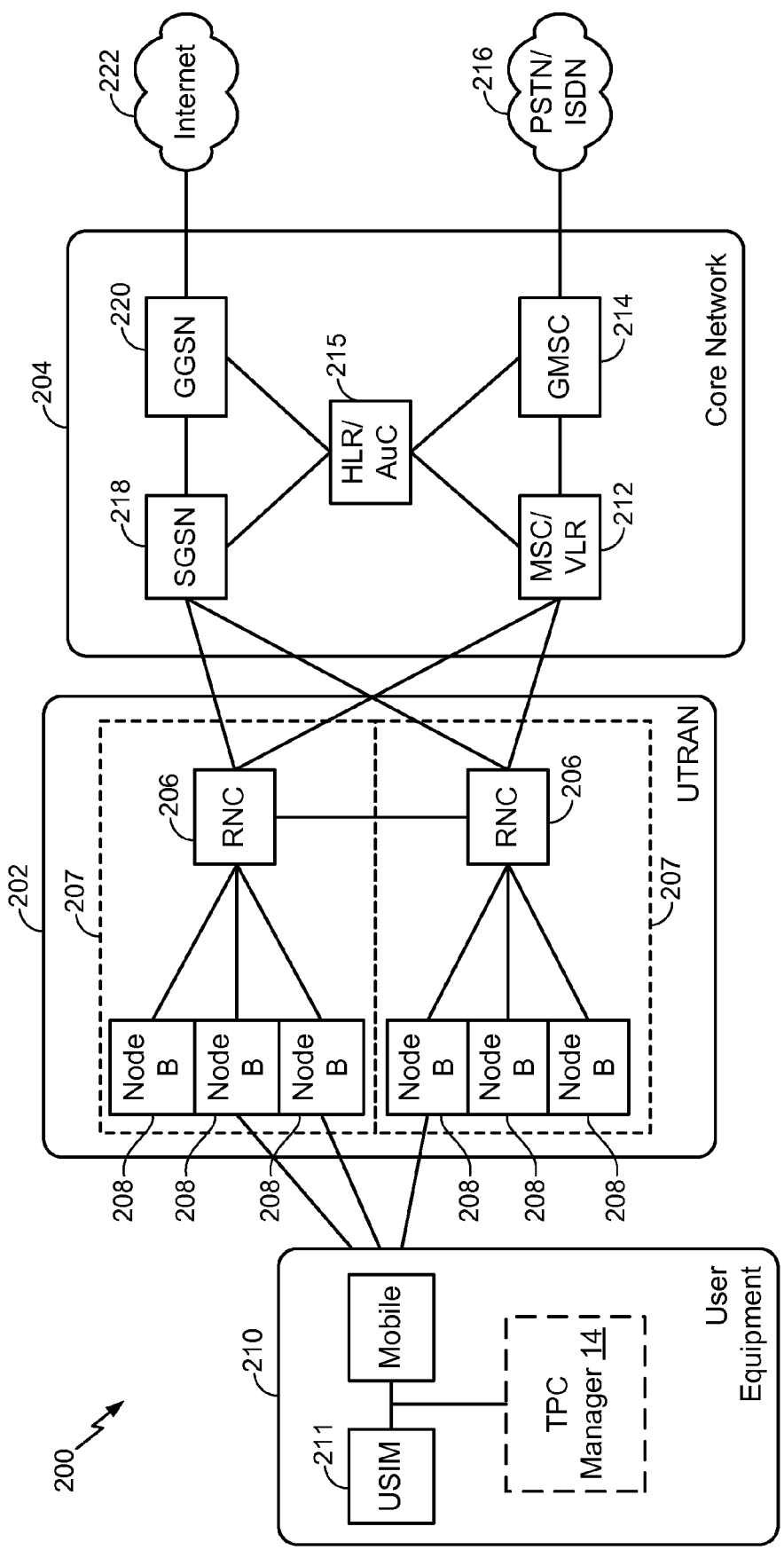
FIG. 7 is a block diagram conceptually illustrating an example of a telecommunications system including a user equipment the same as or similar to the user equipment of FIG. 1.

Referring to FIG. 7, by way of example and without limitation, the aspects of the present disclosure are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. UE 210 may be the same as, or similar to, UE 12 (FIG. 1), e.g., including transmit power control manager 14 (FIG. 1) and communications component 32 (FIG. 1). In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 8:
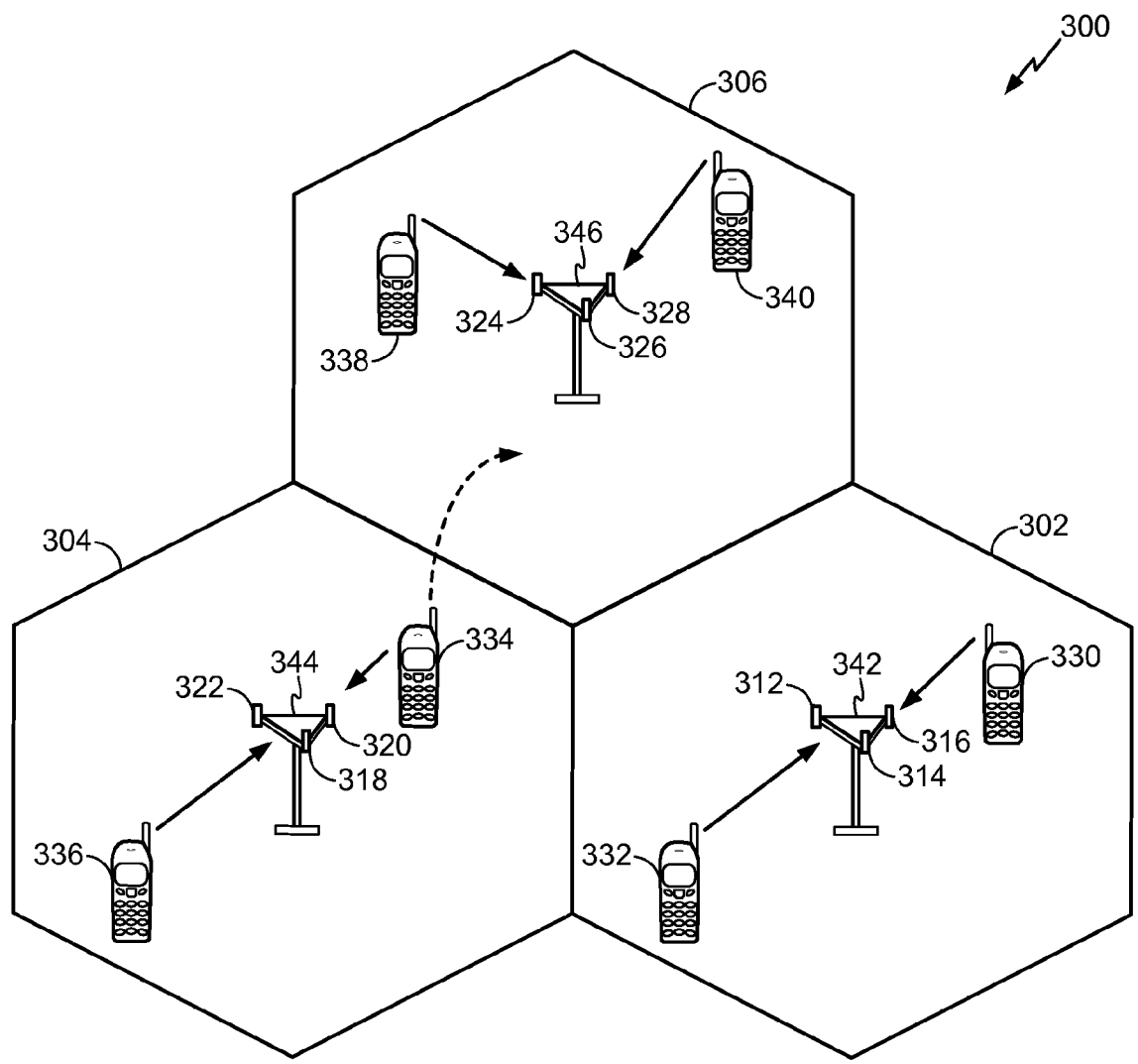
FIG. 8 is a conceptual diagram illustrating an example of an access network including a user equipment the same as or similar to the user equipment of FIG. 1.

Referring to FIG. 8, an access network 300 in a UTRAN architecture is illustrated including one or more UE's that may be the same as, or similar to, UE 12 (FIG. 1), e.g., including transmit power control manager 14 (FIG. 1) and communications component 32 (FIG. 1). The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 7) for all the UEs 330, 332, 334, 336, 338, 340 in the respective cells 302, 304, and 306.

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 4), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 9.

Figure 9:
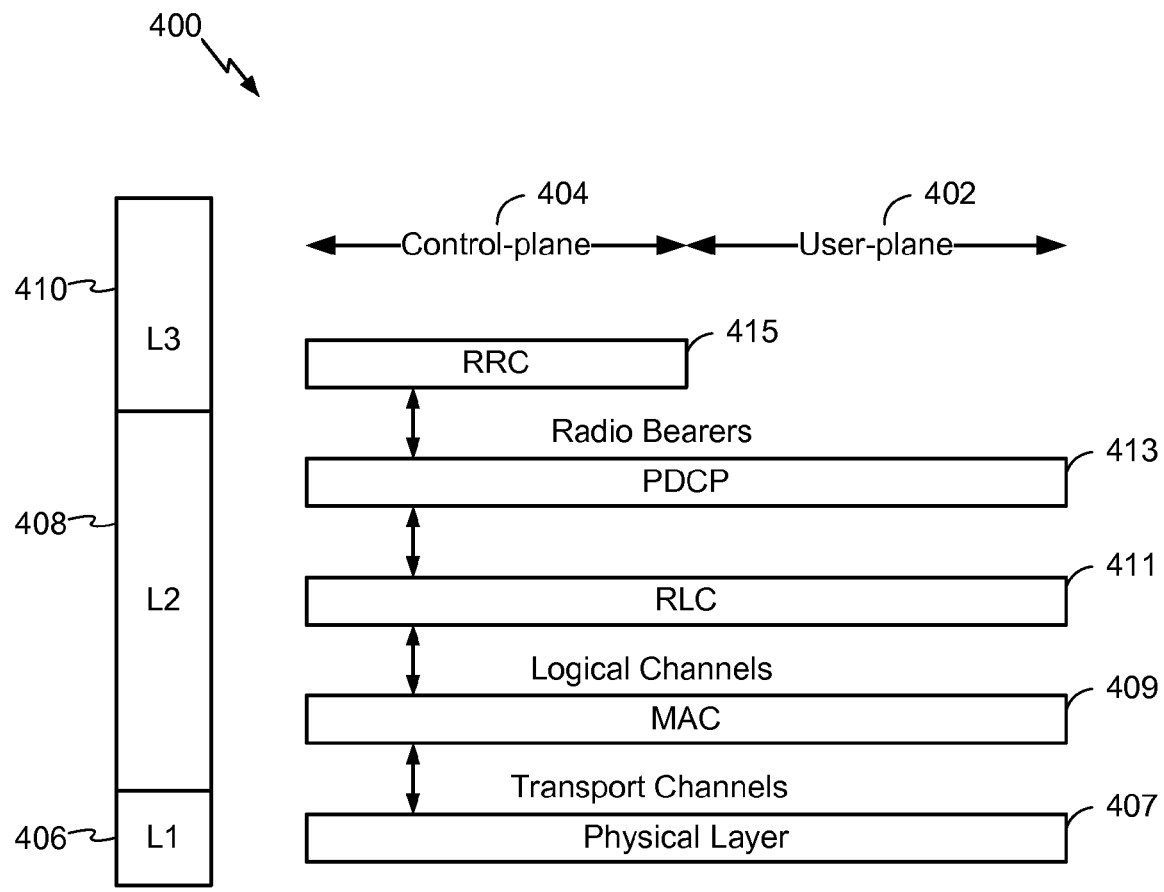
FIG. 9 is a conceptual diagram illustrating an example of a radio protocol architecture for the user and control plane that may be utilized by the user equipment of FIG. 1.

Referring to FIG. 9, an example radio protocol architecture 400 relates to the user plane 402 and the control plane 404 of a user equipment (UE) or node B/base station. For example, architecture 400 may be included in a UE, which may be the same as, or similar to, UE 12 (FIG. 1), e.g., including transmit power control manager 14 (FIG. 1) and communications component 32 (FIG. 1). The radio protocol architecture 400 for the UE and node B is shown with three layers: Layer 1 406, Layer 2 408, and Layer 3 410. Layer 1 406 is the lowest lower and implements various physical layer signal processing functions. As such, Layer 1 406 includes the physical layer 407. Layer 2 (L2 layer) 408 is above the physical layer 407 and is responsible for the link between the UE and node B over the physical layer 407. Layer 3 (L3 layer) 410 includes a radio resource control (RRC) sublayer 415. The RRC sublayer 415 handles the control plane signaling of Layer 3 between the UE and the UTRAN.

In the user plane, the L2 layer 408 includes a media access control (MAC) sublayer 409, a radio link control (RLC) sublayer 411, and a packet data convergence protocol (PDCP) 413 sublayer, which are terminated at the node B on the network side. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 413 provides multiplexing between different radio bearers and logical channels. The PDCP sublayer 413 also provides header compression for upper layer data packets to reduce radio transmission overhead, security by ciphering the data packets, and handover support for UEs between node Bs. The RLC sublayer 411 provides segmentation and reassembly of upper layer data packets, retransmission of lost data packets, and reordering of data packets to compensate for out-of-order reception due to hybrid automatic repeat request (HARQ). The MAC sublayer 409 provides multiplexing between logical and transport channels. The MAC sublayer 409 is also responsible for allocating the various radio resources (e.g., resource blocks) in one cell among the UEs. The MAC sublayer 409 is also responsible for HARQ operations.

Figure 10:
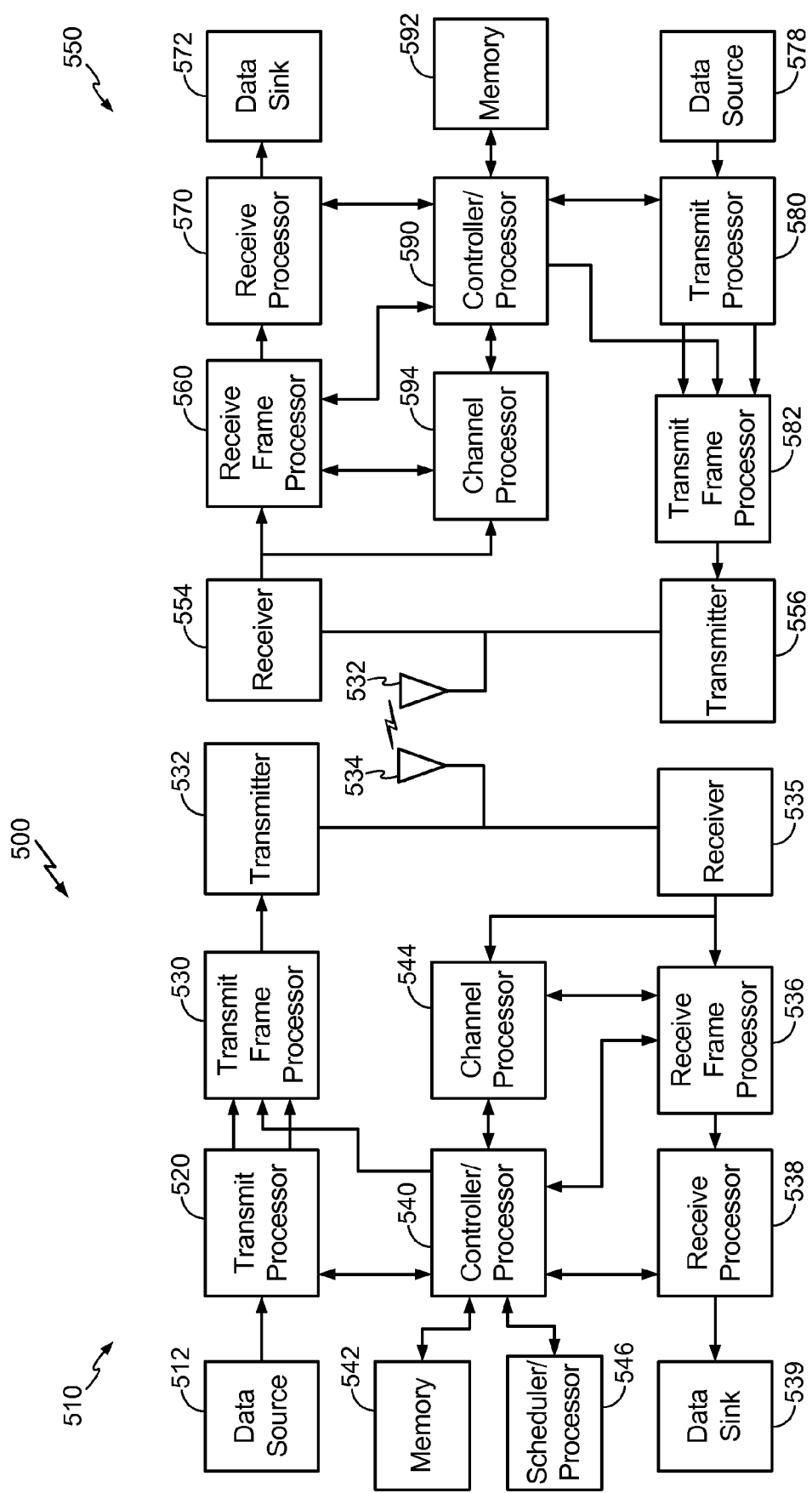
FIG. 10 is a block diagram conceptually illustrating an example of a Node B in communication with a user equipment in a telecommunications system, where the user equipment may include a user equipment the same as or similar to the user equipment of FIG. 1.

Referring to FIG. 10, in an aspect, a Node B 510 is in communication with a UE 550, where the Node B 510 may be the Node B 208 in FIG. 4, and the UE 550 may be the same as, or similar to, UE 12 (FIG. 1), e.g., including transmit power control manager 14 (FIG. 1) and communications component 32 (FIG. 1). In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

As those skilled in the art will readily appreciate, various aspects described throughout this disclosure may be extended to other telecommunication systems, network architectures and communication standards where a high speed channel is only supported between a UE and a single base station when the UE is in soft handover with two base stations. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of controlling a transmit power level of a user equipment in a wireless communication system, comprising:
communicating with a first base station and a second base station;
establishing a high speed channel with one of the first base station or the second base station, wherein the one of the first base station or the second base station defines a high speed serving cell and a remaining one of the first base station or the second base station defines a non-high speed cell;
determining whether a high speed power control state applies to controlling the transmit power level;
determining whether scheduled data for transmission on the high speed channel is greater than or equal to a scheduled data for transmission threshold; and
ignoring a transmit power control command from the non-high speed based on both a determination that the high speed power control state applies to controlling the transmit power level and a determination that the scheduled data for transmission on the high speed channel is greater than or equal to the scheduled data for transmission threshold.

2. The method of claim 1, wherein establishing the high speed channel further comprises establishing a high speed downlink packet access (HSDPA) channel.

3. The method of claim 2, wherein the high speed power control state comprises an absolute state corresponding to the establishing of the high speed channel with the high speed serving cell.

4. The method of claim 3, wherein establishing the high speed channel comprises receiving a high speed transmit power control index message associated with the HSDPA channel.

5. The method of claim 3, further comprising
executing only transmit power control commands received from the high speed serving cell during the absolute state when the absolute state applies to controlling the transmit power level, wherein the communicating with the first base station and the second base station defines a soft handover.

6. The method of claim 1, further comprising determining that a discontinuous transmission state exists for communications from the high speed serving cell based on a determination that the scheduled data for transmission on the high speed channel is less than the scheduled data for transmission threshold.

7. The method of claim 1, wherein:
the transmit power control command comprises the down command, and
ignoring the transmit power control command from the non-high speed cell comprises ignoring the down command.

8. The method of claim 1, further comprising:
de-establishing the high speed channel;
determining the high speed power control state does not apply based on the de-establishing of the high speed channel; and
executing power control commands from both the non-high speed cell and the high speed cell when the high speed power control state does not apply.

9. The method of claim 1, further comprising executing any transmit power control command received from the non-high speed cell or from the high speed channel based on a determination that the scheduled data for transmission on the high speed channel is less than the scheduled data for transmission threshold.

10. An apparatus for controlling a transmit power level in a wireless communication system, comprising:
means for communicating with a first base station and a second base station;
means for establishing a high speed channel with one of the first base station or the second base station, wherein the one of the first base station or the second base station defines a high speed serving cell and a remaining one of the first base station or the second base station defines a non-high speed cell;
means for determining whether a high speed power control applies to controlling the transmit power level;
means for determining whether scheduled data for transmission on the high speed channel is greater than or equal to a scheduled data for transmission threshold; and
means for ignoring a transmit power control command from the non-high speed cell based on both a determination that the high speed power control state applies to controlling the transmit power level and a determination that the scheduled data for transmission on the high speed channel is greater than or equal to the scheduled data for transmission threshold.

11. The apparatus of claim 10, wherein the means for establishing the high speed channel further comprises means for establishing a high speed downlink packet access (HSDPA) channel.

12. The apparatus of claim 11, wherein the high speed power control state comprises an absolute state corresponding to the establishing of the high speed channel with the high speed serving cell.

13. The apparatus of claim 12, wherein the means for establishing the high speed channel comprises means for receiving a high speed transmit power control index message associated with the HSDPA channel.

14. The apparatus of claim 12, further comprising means for executing only transmit power control commands received from the high speed serving cell during the absolute state when the absolute state applies to controlling the transmit power level, wherein the communicating with the first base station and the second base station defines a soft handover.

15. The apparatus of claim 10, further comprising means for determining that a discontinuous transmission state exists for communications from the high speed serving cell based on a determination that the scheduled data for transmission on the high speed channel is less than the scheduled data for transmission threshold.

16. A non-transitory computer-readable medium storing computer-executable code for controlling a transmit power level of a user equipment in a wireless communication system, the computer-executable code comprising:
code for communicating with a first base station and a second base station;

code for establishing a high speed channel with one of the first base station or the second base station, wherein the one of the first base station or the second base station defines a high speed serving cell and a remaining one of the first base station or the second base station defines a non-high speed cell;

code for determining whether a high speed power control state applies to controlling the transmit power level;

code for determining whether scheduled data for transmission on the high speed channel is greater than or equal to a scheduled data for transmission threshold; and code for ignoring a transmit power control command from the non-high speed cell based on both a determination that the a high speed power control state applies to controlling the transmit power level and a determination that the scheduled data for transmission on the high speed channel is greater than or equal to the scheduled data for transmission threshold.

17. The computer-readable medium of claim 16, wherein the code for establishing the high speed channel further comprises code for establishing a high speed downlink packet access (HSDPA) channel.

18. The computer-readable medium of claim 17, wherein the high speed power control state comprises an absolute state corresponding to establishment of of the high speed channel with the high speed serving cell.

19. The computer-readable medium of claim 18, wherein the code for establishing the high speed channel comprises code for receiving a high speed transmit power control index message associated with the HSDPA channel.

20. The computer-readable medium of claim 18, further comprising code for executing only transmit power control commands received from the high speed serving cell during the absolute state when the absolute state applies to controlling the transmit power level, wherein communication with the first base station and the second base station defines a soft handover.

21. The computer-readable medium of claim 16, further comprising code for determining that a discontinuous transmission state exists for communications from the high speed serving cell based on a determination that the scheduled data for transmission on the high speed channel is less than the scheduled data for transmission threshold.

22. An apparatus for controlling a transmit power level in a wireless communication system, comprising:
at least one processor; and
a memory coupled to the at least one processor,
wherein the at least one processor is configured to:
communicate with a first base station and a second base station;
establish a high speed channel with one of the first base station or the second base station, wherein the one of the first base station or the second base station defines a high speed serving cell and a remaining one of the first base station or the second base station defines a non-high speed cell;
determine whether a high speed power control state applies to coil oiling the transmit power level;
determine whether scheduled data for transmission on the high speed channel is greater than or equal to a scheduled data for transmission threshold; and
ignore a transmit power control command from the non-high speed cell based on both a determination that the high speed power control state applies to controlling the transmit power level and a determination that the scheduled data for transmission on the high speed channel is greater than or equal to the scheduled data for transmission threshold.

23. The apparatus of claim 22, wherein to establish the high speed channel, the at least one processor is further configured to establish a high speed downlink packet access (HSDPA) channel.

24. The apparatus of claim 23, wherein establishing the high speed channel comprises an absolute state corresponding to the establishing of the high speed channel with the high speed serving cell.

25. The apparatus of claim 24, wherein the absolute state comprises receiving a high speed transmit power control index message associated with the HSDPA channel.

26. The apparatus of claim 24, wherein the at least one processor is further configured to executing only transmit power control commands received from the high speed serving cell during the absolute state when the absolute state applies to controlling the transmit power level, wherein the communicating with the first base station and the second base station defines a soft handover.

27. The apparatus of claim 22, wherein the at least one processor is further configured to determine that a discontinuous transmission state exists for communications from the high speed serving cell based on a determination that the scheduled data for transmission on the high speed channel is less than the scheduled data for transmission threshold.

28. The apparatus of claim 22, wherein:
the transmit power control command comprises the down command, and
to ignore the transmit power control command from the non-high speed cell, the at least one processor is further configured to ignore the down command.

29. The apparatus of claim 22, wherein the at least one processor is further configured to:
de-establish the high speed channel;
determine the high speed power control state does not apply based on the de-establishing of the high speed channel; and
execute power control commands from both the non-high speed cell and the high speed cell when the high speed power control state does not apply.

* * * * *